United States Patent [19]
Ohtani et al.

[11] Patent Number: 4,818,613
[45] Date of Patent: Apr. 4, 1989

[54] SINGLE TOW PREPREG

[75] Inventors: Shigeki Ohtani; Kazuhiro Suzuoki, both of Moriyama, Japan

[73] Assignees: Ciba-Geigy Corp., Ardsley, N.Y.; Asahi Kasei Kogyo Kabushiki Kaisha, Osaka, Japan

[21] Appl. No.: 185,285

[22] Filed: Apr. 15, 1988

Related U.S. Application Data

[63] Continuation of Ser. No. 922,624, Oct. 24, 1986, abandoned.

[30] Foreign Application Priority Data

Oct. 25, 1985 [JP] Japan ................................ 60-239230

[51] Int. Cl.$^4$ ............................................. D02G 3/00
[52] U.S. Cl. ................................. 428/396; 428/366; 428/367; 428/375; 428/378; 428/392; 428/394; 428/395

[58] Field of Search ............... 428/366, 367, 375, 378, 428/392, 394, 395, 396

[56] References Cited

U.S. PATENT DOCUMENTS

| | | | |
|---|---|---|---|
| 4,016,022 | 4/1977 | Browning et al. | 428/367 |
| 4,126,729 | 11/1978 | Richardson et al. | 428/375 |
| 4,187,347 | 2/1980 | Brook | 428/395 |
| 4,230,766 | 10/1980 | Gaussens et al. | 428/396 |
| 4,309,473 | 1/1982 | Minamisawa et al. | 428/902 |
| 4,446,255 | 5/1984 | Ying et al. | 428/375 |

*Primary Examiner*—Sharon A. Gibson
*Attorney, Agent, or Firm*—Harry Falber

[57] ABSTRACT

A single tow prepreg which is impregnated with a composition comprising 100 parts by weight of a thermosetting resin having a softening point below 20° C. and 3 to 30 parts by weight of a high molecular weight compound having a glass transition temperature below −10° C. This prepreg is characterized in particular by high flexibility and non-tackiness.

3 Claims, 1 Drawing Sheet

SINGLE TOW PREPREG

This application is a continuation, of application Ser. No. 922,624, filed 10/24/86, now abandoned.

The present invention relates to fibre strands which are impregnated with a composition comprising a duroplastic polymer and a high molecular weight compound.

Recently, various fibre-reinforced plastics have been used in a number of different field on account of their light weight, high strength and high elasticity. Up to now, these prepregs have been used mostly in the form of unidirectional sheets or of fabrics. The still uncured impregnating resin present in these prepregs is extremely tacky, so that they have to be covered with removable paper during storage to prevent adhesion.

A non-tacky, non-adhesive and flexible single tow prepreg is disclosed in DE-OS 29 47 909. However, it does not meet all the stringent requirements made of single tow prepregs. Hence it is the object of the present invention to provide a prepreg whose flexibility and non-tackiness enable it to be sufficiently processed over a wide temperature range from 5° to 40° C., and from which a cured product with excellent properties is obtained.

Accordingly, the present invention relates to a single tow prepreg which is prepared by impregnating a single tow with a composition that contains 100 parts by weight of a thermosetting resin having a softening point below 20° C., and 3 to 30 parts by weight of a high molecular weight compound having a glass transition temperature below −10° C.

Figure 1:
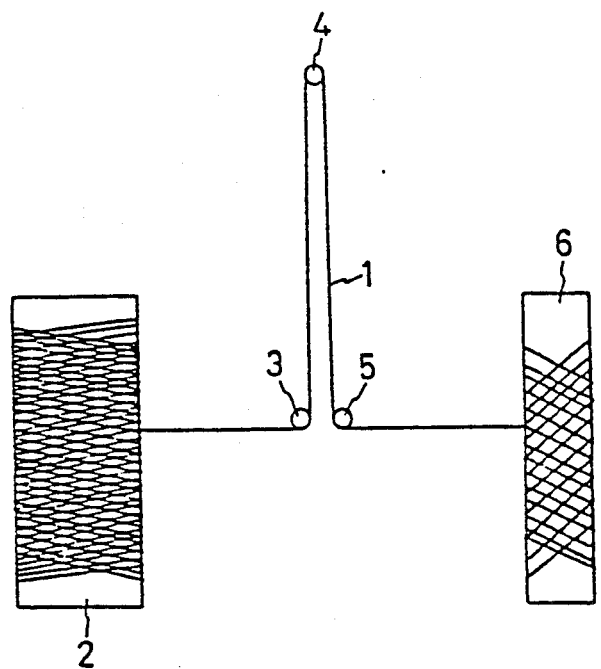
FIG. 1 illustrates the apparatus to determine the non-tackiness and flexibility of the single tow prepreg.

The term "single tow" as employed herein shall be understood as meaning a fibre bundle composed of several hundreds to several tens of thousands of individual filaments. These individual filaments have a diameter from several microns to several hundred microns and are continuous filaments.

Examples of filaments eligible for use in the single tow prepreg of this invention are carbon fibres, glass fibres, aramide fibres, boron fibres, silicon carbide fibres and the like.

The choice of thermosetting resin having a softening point below 20° C. (determined by the Duran mercury method) is not critical. Any of the resins hitherto employed in prepreg technology can be used, e.g. epoxy resins, phenolic resins, unsaturated polyesters, epoxy acrylates, urethane acrylates, polyimides and the like. Epoxy resins are preferred. The resin need not be a single polymer, but can be a mixture of two or more polymers, for example a mixture of an epoxy resin which is solid at room temperature and an epoxy resin which is liquid at room temperature, so as to achieve a softening point which is below 20° C.

Further, it is also possible to add a plasticiser, e.g. a minor amount of a high-boiling plasticiser, so that the properties of the resins are not impaired. Examples of such plasticisers are phosphates, phthalates, fatty acid esters, as well as esters derived from diols or oxyacids.

Particularly preferred thermosetting resins are mixtures obtained by mixing two parts by weight of an epoxy resin which is liquid at room temperature at 20° C. with 5 to 80 parts by weight of an epoxy resin with a molecular weight of 800 to 2000 to give a polymer mixture having a softening point below 20° C.

The choice of high molecular weight compound which has a glass transition temperature below −10° C. is not critical, provided it is sufficiently miscible with the thermosetting resin.

Examples of high molecular weight compounds are: polybutadiene, polyisoprene, chloroprene, styrene - butadiene copolymers (random and block copolymers), acrylonitrile copolymers, ethylene/vinyl acetate copolymers which may be partially hydrolysed, polypropylene glycol, ethylene glycol/propylene glycol copolymers, epichlorohydrin rubber, acrylic rubber and polyurethane rubber.

This high molecular weight compound is incorporated into the thermosetting resin in an amount of 3 to 30 parts by weight, based on 100 parts by weight of said resin. If smaller amounts are used, then non-tackiness and flexibility are insufficient, whereas larger amounts result in loss of the desired properties of the thermosetting resin, e.g. hardness.

The glass transition temperature of below −10° C. is also critical, for if it is higher, then flexibility is not ensured within the wide limits of 5° to 40° C.

A solvent is normally not employed for impregnating the tow. If desired or necessary, however, a solvent may be used.

In the practice of this invention, the individual strands are processed to prepregs in a manner known per se, for example by immersing the individual strands continuously in an impregnating bath that contains the resin composition described above, removing excess resin, and winding up the impregnated prepreg.

When the single tow prepreg is further processed to e.g. braids, winding filaments and the like, it has excellent flexibility and non-tackiness. In addition, the tow is distinguished by ready processibility to good products over a wide temperature range, resulting in high productivity.

The prepregs of this invention are easy to prepare and are superior to conventional single two prepregs as regards flexibility and non-tackiness as well as brittleness.

EXAMPLE 1

100 parts by weight of an epoxy resin which is liquid at room temperature (Araldit ® GY 260) and 20 parts by weight of an epoxy resin which is solid at room temperature (Araldit ® 7072) are mixed to give a mixture having a softening point of 10° C. To this mixture is added a solution of 7 parts by weight of polypropylene glycol (mol. wt. ~30,000) in methyl ethyl ketone, followed by the addition of 4 parts by weight of dicyandiamide and 5 parts by weight of 3-(3,4-dichlorophenyl)-1,1-N-dimethylurea. The resultant mixture is thoroughly stirred to give an impregnating solution.

A strand of carbon fibres (filaments of 7 mm diameter; c. 6000 filaments) is passed through this solution. The strand is then drawn through two bars to remove excess resin, heated for 3 minutes at 100° C. in a hot air oven to remove the solvent, and then wound on a bobbin.

The non-tackiness and flexibility of the single tow prepreg is then determined using the apparatus illustrated in FIG. 1. This is done by winding the single tow prepreg 1, which is itself wound onto a paper tube 2 (external diameter: 75 mm), via three non-rotating stainless steel rods 3, 4 and 5 (diameter: 5 mm) onto a second paper tube (external diameter: 20 mm). The load applied is 200 g. In all tests, the single tow prepreg is wound at a speed of 20 m/min, showing that this prepreg is most suitable for use in actual practice.

Further, several pieces of such a single tow prepreg are arranged in one direction and pressed at 100° C. on a roll mill to prepreg sheets.

Then 8 such sheets are pressed at 130° C. and a pressure of 7 kg/cm² for 60 minutes to a laminate having a thickness of 2 mm. The laminate (fibre volume: 55% by weight) has the following properties:

bending strength: 140 kg/mm²
bending modulus: 12 t/mm²
interlaminar shearing strength 9.4 kg/mm²

EXAMPLE 2

An epoxy resin mixture comprising 50 parts by weight of Araldit® GY 260, 30 parts by weight off Araldit® EPN 11338 and 20 parts by weight of Araldit® ECN 1237 is used. The mixture has a softening point of 5° C. This resin is intimately mixed with a solution of 10 parts by weight of ethylene/vinyl acetate copolymer (glass transition temperature: −30° C.) in ethylene dichloride, and in addition with 4 parts by weight of dicyandiamide and 5 parts by weight of 3-(3,4-dichlorophenyl)-1,1-dimethylurea. A glass roving (580 tex) is passed through this mixture and treated in the same manner as described in Example 1. The resin contents is 27%. In the temperature range from 5°–40° C., the flexibility and non-tackiness of this prepreg are comparable to those of the prepreg obtained in Example 1.

EXAMPLE 3

A resin composition having a softening point of 18° C. and comprising 100 parts by weight of an unsaturated polyester (consisting of 45 mol % of isophthalic acid, 55 mol % of maleic anhydride and 100 mol % of propylene glycol) and 20 parts by weight of diallyl phthalate, 8 parts by weight of tricresyl phosphate and 2 parts by weight of tert-butyl perbenzoate is intimately mixed with a solution of 15 parts by weight of a styrene/butadiene copolymer in ethylene dichloride. A carbon fibre strand (c. 3000 single filaments) is passed through this impregnating solution and the prepreg is prepared as described in Example 1. The excellent non-tackiness properties are determined at 10° and 25° C.

What is claimed is:

1. A single tow prepreg which is impregnated with a composition comprising 100 parts by weight of a thermosetting resin having a softening point below 20° C. and 3 to 30 parts by weight of a high molecular weight compound having a glass transition temperature below −10° C. selected from the group consisting of polybutadiene, polyisoprene, chloroprene, styrene-butadiene copolymer, an acrylonitrile copolymer, an ethylene/vinyl acetate copolymer, polypropylene glycol, an ethylene glycol/propylene glycol copolymer, epichlorohydrin rubber, acrylic rubber and, polyurethane rubber.

2. A prepreg according to claim 1, wherein the single filaments of which the single tow is composed are carbon, glass, aramide, boron or silicon carbide fibres.

3. A prepreg according to claim 1, wherein the thermosetting resin is an epoxy resin, a phenolic resin, an unsaturated polyester, a epoxy acrylate, a urethane acrylate or a polyimide.

* * * * *